(12) United States Patent
Lin et al.

(10) Patent No.: US 12,491,883 B1
(45) Date of Patent: Dec. 9, 2025

(54) PLANNING LANE CHANGES FOR AUTONOMOUS VEHICLES USING MACHINE LEARNING

(71) Applicant: Waymo LLC, Mountain View, CA (US)

(72) Inventors: Fuming Lin, Mountain View, CA (US); Ross Peter Anderson, San Francisco, CA (US); Christopher Burgess Bowen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 415 days.

(21) Appl. No.: 17/941,890

(22) Filed: Sep. 9, 2022

Related U.S. Application Data

(60) Provisional application No. 63/242,256, filed on Sep. 9, 2021.

(51) Int. Cl.
| | |
|---|---|
| *B60W 40/04* | (2006.01) |
| *B60W 30/18* | (2012.01) |
| *B60W 50/00* | (2006.01) |
| *B60W 60/00* | (2020.01) |
| *G06N 3/049* | (2023.01) |

(52) U.S. Cl.
CPC ...... *B60W 30/18163* (2013.01); *B60W 40/04* (2013.01); *B60W 50/0097* (2013.01); *B60W 60/0011* (2020.02); *B60W 60/00274* (2020.02); *G06N 3/049* (2013.01); *B60W 2050/0029* (2013.01); *B60W 2554/4041* (2020.02); *B60W 2554/4045* (2020.02)

(58) Field of Classification Search
CPC .......... B60W 30/18163; B60W 40/04; B60W 50/0097; B60W 60/0011; B60W 60/00274; B60W 2050/0029; B60W 2554/4041; B60W 2554/4045; G06N 3/049

See application file for complete search history.

(56) References Cited

U.S. PATENT DOCUMENTS

| | | | |
|---|---|---|---|
| 2019/0016339 A1* | 1/2019 | Ishioka | B60W 30/0956 |
| 2019/0179304 A1* | 6/2019 | Iagnemma | B60W 60/0011 |
| 2019/0329777 A1* | 10/2019 | Rajab | B60W 40/04 |
| 2021/0108936 A1* | 4/2021 | Seegmiller | B60W 60/0011 |
| 2023/0084578 A1* | 3/2023 | Sadeghi | B60W 60/0011 701/23 |

OTHER PUBLICATIONS

Wikipedia.org [online], "Optimal substructure," last edited Nov. 13, 2023, retrieved on Dec. 7, 2023, retrieved from URL<https://en.wikipedia.org/wiki/Optimal_substructure/>, 2 pages.

* cited by examiner

*Primary Examiner* — Nga X Nguyen
(74) *Attorney, Agent, or Firm* — Fish & Richardson P.C.

(57) ABSTRACT

Methods, systems, and apparatus, including computer programs encoded on computer storage media, for planning lane changes for autonomous vehicles.

20 Claims, 4 Drawing Sheets

PLANNING LANE CHANGES FOR AUTONOMOUS VEHICLES USING MACHINE LEARNING

CROSS-REFERENCE TO RELATED APPLICATION

This application claims priority to U.S. Provisional Application No. 63/242,256, filed on Sep. 9, 2021. The disclosure of the prior application is considered part of and is incorporated by reference in the disclosure of this application.

BACKGROUND

This specification relates to planning the future trajectory of an agent in an environment.

The environment may be a real-world environment, and the agent may be, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

SUMMARY

This specification generally describes a system implemented as computer programs on one or more computers in one or more locations that plans lane changes for an autonomous vehicle. In other words, the system generates a trajectory for a vehicle to execute a lane change.

That is, the system can generate data that defines a path from a first lane to a second lane of a road in an environment. For example, the system can be on-board the vehicle and can generate trajectories for the vehicle as the vehicle navigates in a real-world environment. As another example, the system can be a component of a simulation system that is configured to simulate one or more vehicles operating in a virtual environment.

The subject matter described in this specification can be implemented in particular embodiments so as to realize one or more of the following advantages.

Using some existing techniques, to generate a trajectory for a lane change, a system must first select a position in the new lane (i.e., a pair of agents in the new lane to merge between) and then generate a trajectory to merge into the selected position. Using techniques described in this specification, a system can generate a trajectory by concurrently considering multiple positions in the new lane. The system can generate candidate trajectories corresponding to multiple different positions, and select the best candidate trajectory from among the candidates. Considering multiple positions in parallel can allow the system to select trajectories that execute the lane change more smoothly, safely, and/or quickly.

Using some existing techniques, to execute a lane change a system must plan the geometry of the trajectory (e.g., by planning wheel angles of the vehicle to execute the trajectory) and the speed of the trajectory separately. For example, the existing techniques may require the system to confirm that a trajectory has a feasible geometry before computing the speed to execute the trajectory. Such existing techniques can therefore impose a limitation of the complexity of the geometries for the generated trajectories, because the computation to determine the feasibility of a geometry can itself be infeasible in real time if the geometry is complex (e.g., a high-dimensional spline). Using techniques described in this specification, a system can generate a trajectory autoregressively across future time points such the geometry and the speed associated with the trajectory are generated concurrently. That is, the system can generate both the geometry and speed associated with a trajectory in a single pass, in some implementations allowing the system to generate trajectories with arbitrarily complex geometries.

Using techniques described in this specification, a system can evaluate a large number of different candidate trajectories in real time to select a final trajectory for executing a lane change. For example, the system can concurrently evaluate tens, hundreds, thousands, or tens of thousands of candidate trajectories. Thus, the system can execute a thorough search of the space of possible candidate trajectories and select the best trajectory. The selected trajectory can thus execute the lane change more smoothly, safely, and/or quickly that trajectories generated using existing techniques that cannot evaluate as many candidates in real-time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a lane change system on-board a vehicle, e.g., an autonomous or semi-autonomous vehicle, can generate a lane change trajectory for the vehicle by iteratively expanding candidate trajectories. By iteratively expanding the candidate trajectories, the system can accurately consider the impact of the candidates on surrounding agents and the impact of surrounding agents on the future motion of the vehicle.

In this specification, a "surrounding agent" can refer, without loss of generality, to a vehicle, bicycle, pedestrian, ship, drone, or any other moving object in an environment.

Figure 1:
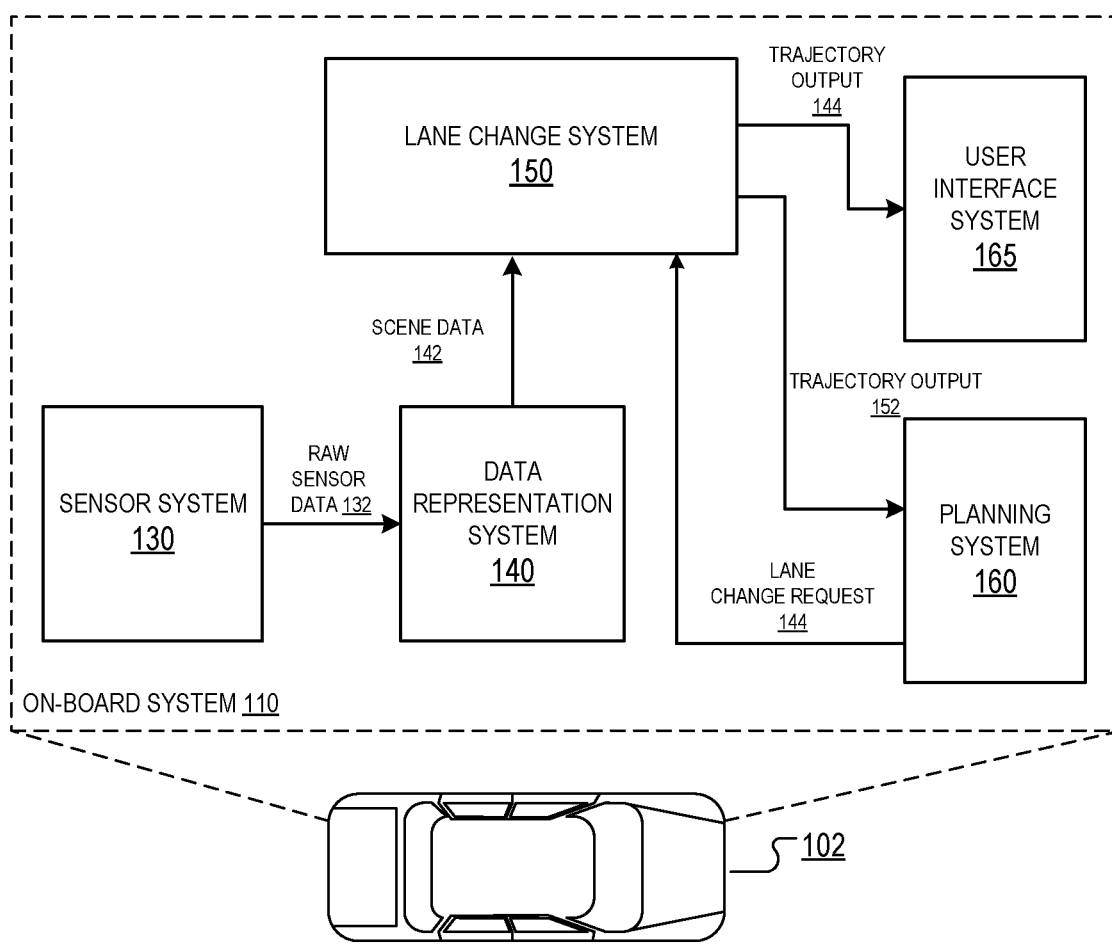
FIG. 1 is a diagram of an example system.

FIG. 1 is a diagram of an example system 100. The system 100 includes an on-board system 110.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a planning system 160.

The planning system 160 can make autonomous or semi-autonomous driving decisions for the vehicle 102, e.g., by generating a planned vehicle path that characterizes a path that the vehicle 102 will take in the future.

At some points during the navigation of the vehicle 102, the planning system 160 can determine that the vehicle should change lanes from the current lane in which the vehicle is currently located to another lane on the same road. For example, the planning system 160 may determine that the vehicle 102 needs to change lanes to avoid stopped traffic, to avoid a lane closure, to allow the vehicle to later execute a turn, to allow the vehicle to later pull-over, park, or take a freeway exit, or for any other appropriate reason.

Generally, a lane change is a complex maneuver that requires the vehicle 102 to account for the current and future behavior of surrounding agents as well as the roadgraph and other driving rules. For example, when there are multiple surrounding agents travelling in the target lane or predicted to move into the target lane, changing into the target lane may require the vehicle 102 to "slot" in between two surrounding agents while navigating safely and minimizing impact on the flow of traffic.

Therefore, in response to determining that the vehicle 102 should change lanes, the planning system 160 can send a lane change request 144 to a lane change system 150. The lane change request 150 is a request for a lane change trajectory for the vehicle 102 that navigates the vehicle 102 from the current location of the vehicle in a current lane on a roadway to a target lane in the roadway that is specified in the request 144.

The lane change system 150 receives the lane change request 144 from the planning system 160 and scene data 142 from a data representation system 140 and uses the received data to generate trajectory output 152 that specifies a lane change trajectory for the vehicle 102.

In particular, the data representation system 140 is also located on-board the vehicle 102 and receives the raw sensor data 132 from the sensor system 130 and generates the scene data 142. The scene data 142 characterizes the current state of the environment surrounding the vehicle 102 as of the current time point.

For example, the scene data can characterize, for all surrounding agents in the environment, a current state at the current time point and, optionally, a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent.

The scene data also includes data characterizing a current state of the vehicle at the current time point and, optionally, a previous state of the vehicle at one or more respective previous time points.

In some implementations, the scene data also includes data characterizing features of the environment that are obtained from map information characterizing the environment. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

The lane change system 150 processes the scene data 142 to generate the trajectory output 152 in response to the request 154.

More specifically, when generating the trajectory output 152, the lane change system 150 uses the scene data 142 to iteratively expand multiple partial trajectories across multiple stages of processing.

Generating the trajectory output 152 is described in more detail below with reference to FIGS. 2-4.

The on-board system 100 can provide the trajectory output 152 generated by the lane change system 150 to one or more other on-board systems of the vehicle 102, e.g., the planning system 160 and/or a user interface system 165.

When the planning system 160 receives the trajectory output 152, the planning system 160 can use the trajectory prediction outputs 152 to generate planning decisions that plan the future trajectory of the vehicle, i.e., to generate a new planned vehicle path. For example, the planning system 160 can cause the vehicle 102 to follow the lane change trajectory, e.g., by autonomously controlling the steering of the vehicle, or can evaluate the lane change trajectory against other candidate trajectories performed by other subsystems on-board the vehicle 102 to determine which trajectory should be followed by the vehicle 102.

When the user interface system 165 receives the trajectory output 152, the user interface system 165 can use the trajectory output 152 to present information to the driver of the vehicle 102 to assist the driver in operating the vehicle 102 safely. The user interface system 165 can present information to the driver of the vehicle 102 by any appropriate means, for example, by an audio message transmitted through a speaker system of the vehicle 102 or by alerts displayed on a visual display system in the agent (e.g., an LCD display on the dashboard of the vehicle 102). In a particular example, the user interface system 165 can present data specifying the trajectory to the driver to "guide" the driver in following a safe lane changing trajectory.

Figure 2:
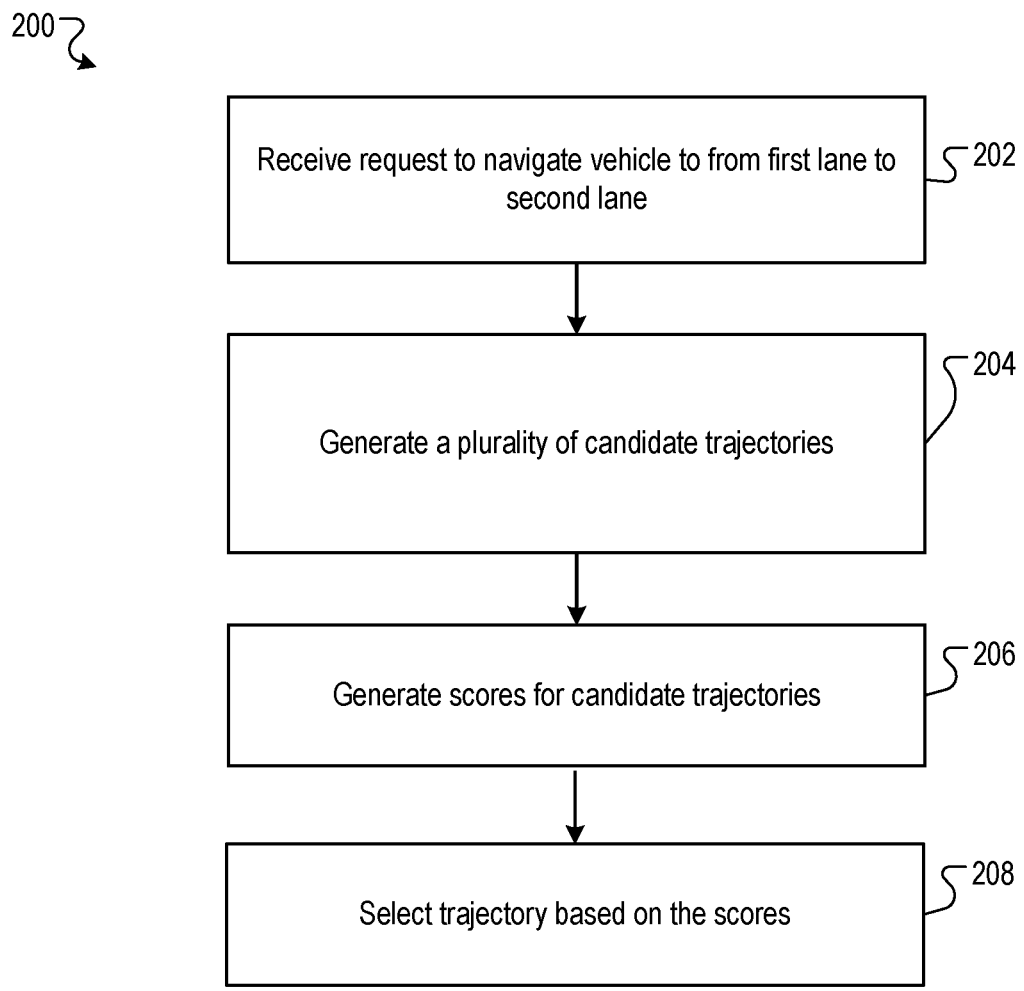
FIG. 2 is a flow diagram of an example process for generating a lane change trajectory.

FIG. 2 is a flow diagram of an example process 200 for generating a lane change trajectory for an autonomous vehicle. For convenience, the process 200 will be described as being performed by a system of one or more computers located in one or more locations. For example, a lane change system, e.g., the lane change system 150 of FIG. 1, appropriately programmed in accordance with this specification, can perform the process 200.

The system receives a request to navigate a vehicle, e.g., an autonomous vehicle, from a current location in a first lane of a road to a second lane of the road (step 202). That is, the system receives a request to generate a trajectory for navigating a vehicle that is currently located at a current location in one lane of a road that has multiple lanes to cause the vehicle to change lanes to another one of the multiple lanes of the road. For example, the system can receive the request to generate the trajectory from an external system, e.g., from a planning system on-board the vehicle (or a simulated version thereof).

In response to receiving the request, the system can generate a set of multiple different candidate trajectories for navigating from the first lane to the second lane (step 204), i.e., from the current location of the vehicle in the first lane of the road to respective locations in the second lane of the road. That is, each candidate trajectory does not necessarily have to have the same endpoint within the second lane and, in fact, different candidate trajectories in the set will generally have different endpoints.

Each candidate trajectory can include a respective location of the vehicle at each of multiple future time points after the current time point. In some implementations, different candidate trajectories can include a different number of future time points; that is, different candidate trajectories can take different amounts of time to execute the lane change.

To generate the set of candidate trajectories, the system can iteratively build up each candidate trajectory in the set by executing a multi-stage process, where each stage corresponds to a respective future time point in a sequence of future time points. For example, the sequence of future time points can include a respective time point at regular intervals, e.g., every second, half-second, quarter of a second, or tenth of a second.

The input to the multi-stage process can include (i) the current location of the vehicle at the current time point and (ii) a respective location for each of one or more surrounding agents in the environment at the current time point. The surrounding agents can include one or more of: one or more vehicles, one or more bicyclists, one or more pedestrians, or one or more agents of any appropriate type. The agents are referred to as "surrounding" agents because they are within range of one or more sensors of the vehicle at the current time (or, optionally, were in range of one or more sensors of the vehicle during a recent time window).

In the first stage ("processing step") of the process corresponding to the first future time step in the sequence of future time steps, the system can identify multiple possible locations that the vehicle can occupy at the first future time step. That is, each possible location is a location in the environment to which the vehicle could feasibly navigate from the current location of the vehicle, during the time frame from the current time point to the first future time point.

The system can then generate a plurality of partial candidate trajectories such that, in each of the partial candidate trajectories, the vehicle is located at a respective first location at the first future time point and the respective first location is navigable from the current location of the vehicle in a time window between the current time point and the first future time point.

One example of performing the first stage of the process is described in more detail below with reference to FIG. 3.

At each subsequent stage in the multi-stage process corresponding to respective subsequent future time steps in the sequence of future time steps, the system can update some or all of the partial candidate trajectories generated during the preceding stage. As one example, the system can update each partial candidate trajectory at each stage. As another example, the system can first determine, for each partial trajectory, whether the vehicle has reached the target lane as of the last time step in the trajectory and only update the partial trajectory if the vehicle has not already reached the target.

For each partial candidate trajectory generated during the preceding stage and that is being updated, the system can add a location for the vehicle corresponding to the future time point of the current stage. For convenience, the future time point corresponding to the preceding stage is called the "preceding future time point" and the future time point corresponding to the current stage is called the "current future time point."

An example of performing a subsequent stage of the multi-stage process is described in more detail below with reference to FIG. 4.

The system can continue performing stages of the process until a termination criterion has been satisfied, e.g., each candidate trajectory has reached the target lane, a threshold number of stages have been performed, or a different criterion has been satisfied.

After the final stage of the multi-stage process, the system has generated a set of candidate trajectories (i.e., the updated partial candidate trajectories generated during the final stage). As will be evident from the description of FIGS. 3 and 4 below, in cases in which there are multiple agents in the second lane of the road (i.e., the lane into which the vehicle is to merge), the set of candidate trajectories can include trajectories in which the vehicle merges into the second lane at respective different "slots", i.e., at different positions in the sequence of agents in the second lane. In other words, the set of candidate trajectories can include, for each of multiple different pairs of agents, one or more respective candidate trajectories in which the vehicle enters the second lane between the pair of agents. Using some existing techniques, a system must execute a first computational step of selecting a position in the sequence of agents, and then execute a second computational step of generating a trajectory in which the vehicle slots into the position when merging into the second lane. Using techniques described in this specification, the system can execute both of these two computational steps concurrently, evaluating in parallel candidate trajectories corresponding to multiple different positions in the sequence of agents in the second lane.

The system can then determine a respective score for each candidate trajectory (step 206).

The system can generate the respective scores for the candidate trajectories in any of a variety of ways and the manner in which the system generates the scores can depend on the objective of the navigation of the vehicle. That is, the system can generate the respective scores to represent the degree to which each of the candidates satisfies the objective for the navigation of the vehicle.

Some non-limiting examples of techniques for generating scores for candidate trajectories now follow.

In some implementations, the system can use a trained machine learning model to generate the score for each candidate trajectory. The machine learning model can be configured through training to process a model input characterizing a candidate trajectory and to generate a score for the candidate trajectory that represents the degree to which the trajectory satisfies the objective. The model input can include, for each future time point in the sequence of future time points, data characterizing a respective state of the vehicle and each surrounding agent in the environment (e.g., data identifying one or more of a location, a velocity, a heading, and so on). For example, the model input can include, for each future time point, a respective top-down image of the environment at the future time point that includes depictions of the vehicle and each surrounding agent. In implementations in which the system generates multiple predicted locations for each agent in the environment, the top-down image can be a heatmap characterizing the predicted locations and corresponding predicted likelihoods.

In some other implementations, the system can compute a heuristic-based score function for each candidate trajectory. For example, the score function can heavily penalize candidate trajectories that lead to a collision or near-collision. As another example, the score function can penalize candidate trajectories in which the vehicle occupies the blind spot of a surrounding agent for a long period of time. As another example, the score function can reward candidate trajectories that execute the lane change relatively quickly. As another example, the score function can penalize candidate trajectories that cause the vehicle to shift away from the second lane (e.g., because such a shift would be difficult to interpret by the other agents in the environment). As another example, the score function can penalize candidate trajectories that cause the vehicle to cross lane boundaries that are not the lane boundary between the first lane and second lane.

As another example, the score function can penalize candidate trajectories that impose discomfort on a surrounding agent. For example, for each candidate trajectory, the system can compute a discomfort score representing the degree to which the behavior of the vehicle is imposing discomfort on a surrounding agent. In some implementations, the system generates a respective discomfort score for each surrounding agent; in some other implementations, the system generates a single discomfort score characterizing the cumulative discomfort imposed on all surrounding agents in the environment. The system can penalize candidate trajectories with higher discomfort scores.

As another example, the system can obtain data representing an initial planned trajectory of the vehicle generated by an external system, e.g., a planning system of the vehicle. The system can reward candidate trajectories that are similar to the initial planned trajectory. In some implementations, the initial planned trajectory has been generated before the decision to execute the lane change. In some other implementations, the initial planned trajectory has been generated after the decision to execute the lane change (and thus the lane change is included in the initial planned trajectory), but the external system that generated the initial planned trajectory is configured to generate trajectories that mimic human behavior without modelling the surrounding agents in the environment. That is, when generating the initial planned trajectory, the external system does not take into consideration the presence or behavior of other agents in the environment. In these implementations, the system can generate a final trajectory that is similar to the initial planned trajectory (and thus itself mimics human behavior) while also taking the other agents in the environment into account.

For example, the data representing the initial planned trajectory can identify, for each future time point in the sequence of future time points, a location of the vehicle. In these implementations, the system can penalize the candidate trajectories according to the distances, across the sequence of future time points, between (i) the location of the vehicle in the candidate trajectory and (ii) the location of the vehicle in the initial planned trajectory. As a particular example, the system can penalize the candidate trajectories according to the average such distance.

As another example, the data representing the initial planned trajectory can include a sequence of heatmaps that each correspond to a respective future time point in the sequence of future time points and that each identify, for each location of multiple locations in the environment, a likelihood that the vehicle occupies the location at the corresponding future time point. In these implementations, the system can reward the candidate trajectories according to the likelihoods, across the sequence of future time points, identified by the initial planned trajectory, that the vehicle occupies the location identified by the candidate trajectory. As a particular example, the system can reward the candidate trajectories according to the average such likelihood.

As a particular example, the initial planned trajectory can be generated using an attention-based neural network, e.g., a transformer neural network, that is configured to generate trajectories by autoregressively generating locations for the vehicle at respective future time points in a sequence of future time points. The attention-based neural network can be trained using real-world human driving data, and thus can be configured through training to generate initial planned trajectories that mimic trajectories executed by human drivers.

In some implementations, the system can obtain data representing multiple different initial planned trajectories for the vehicle. For example, each initial planned trajectory can correspond to a respective different intent of the vehicle. As a particular example, one or more intents can correspond to respective positions at which the vehicle can merge into the new lane (i.e., positions between respective pairs of other agents in the new lane). The multiple initial planned trajectories can be generated by a machine learning model that has been configured through training to generate a trajectory by processing hint data (e.g., hint data provided by a planning system of the vehicle).

The hint data can characterize an intended future state of the environment (e.g., a future state of the vehicle or an agent in the environment), semantic information pertaining to the vehicle (such as a control decision for the vehicle to execute the lane change), or semantic information pertaining to an agent in the environment (e.g., whether the autonomous vehicle should pass the agent before executing the lane change).

The planning system can generate the hint data in order to control the initial planned trajectory generated by the machine learning model. For example, the planning system can "hint" that the system should generate an initial planned trajectory that results in the vehicle merging at a particular location in the new lane. Controlling the trajectory planning outputs generated by the system can be useful to facilitate safe operation.

Generally, any appropriate neural network architecture that is compatible with the system can be used to process the hint data.

In some implementations, the score function used to generate the respective scores is a weighted sum of multiple parameters, e.g., a set of parameters that includes one or more of the parameters described above.

After generating a respective score for each candidate trajectory, the system can select the final trajectory based on the scores, e.g., select the final trajectory to be the candidate trajectory with the highest score when higher scores indicate higher quality or select the candidate trajectory with the lowest score when scores represents costs to be minimized (step 208). In some implementations, the system can provide the final trajectory to a control system of the vehicle to execute the lane change according to the final trajectory. In some other implementations, the system can provide the final trajectory to a planning system of the vehicle for further processing to generate the trajectory that the vehicle is to take.

Figure 3:
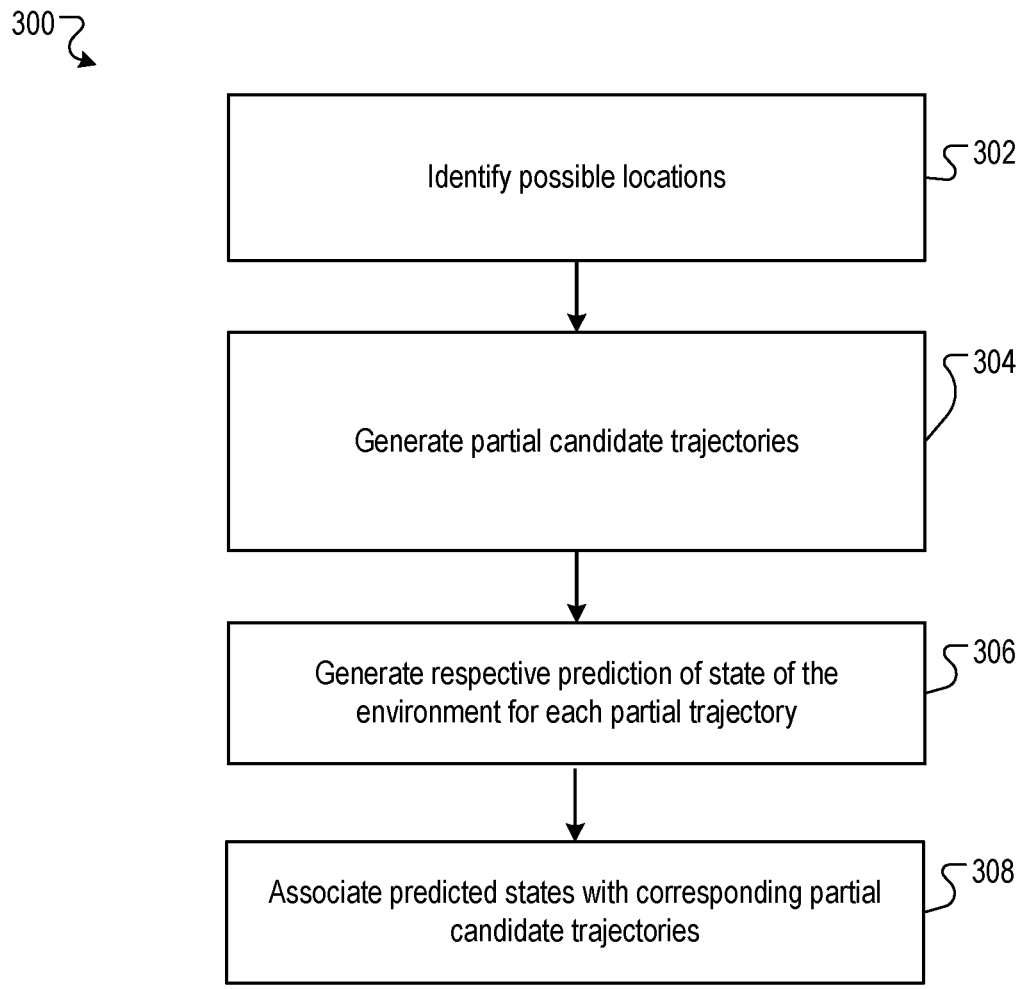
FIG. 3 is a flow diagram of an example process for performing a first stage of a multi-stage process.

FIG. 3 is a flow diagram of an example process 300 for performing the first stage of the multi-stage process. For convenience, the process 300 will be described as being performed by a system of one or more computers located in one or more locations. For example, a lane change system, e.g., the lane change system 150 of FIG. 1, appropriately programmed in accordance with this specification, can perform the process 300.

The system identifies multiple possible locations that the vehicle can occupy at the first future time step (step 302). That is, each possible location is a location in the environment to which the vehicle could feasibly navigate from the current location of the vehicle, during the time frame from the current time point to the first future time point.

In some implementations, the system identifies the possible locations that the vehicle can occupy at the first future time step by imposing a top-down lattice onto the environment. The lattice represents a discretization of the locations in the environment that are navigable by the vehicle. Thus, the system can identify each point of the lattice that corresponds to a location in the environment that is navigable from the current location of the vehicle in a time window between the current time point and the first future time point to which the vehicle can navigate from the current location in the time frame from the current time point to the first future time point. In some such implementations, the lattice is a lane-aligned grid, i.e., a lattice with points at regular intervals along two orthogonal dimensions where one dimension is parallel with the lanes of the road. Generally, the system can sample points in the environment to add to the lattice according to any appropriate sampling policy.

For example, a location can be considered to be "navigable" from a current location in a time window between two time points if the vehicle can reach the location from the current location during the time window without violating any of a set of one or more criteria, e.g., one or more of: exceeding a maximum speed, exceeding a maximum acceleration, violating any traffic laws, and so on.

For each identified possible location of the vehicle at the first future time point, the system generates a respective partial candidate trajectory (step 304). That is, each partial candidate trajectory includes (i) the current location of the vehicle at the current time point and (ii) a respective possible location of the vehicle at the first future time point.

For each partial candidate trajectory generated during the first stage, the system can generate a prediction for the state of the environment at the first future time step, given that the vehicle executes the partial candidate trajectory (step 306).

In particular, for each surrounding agent, the system can generate a prediction for the location of the surrounding agent at the first future time point, given (i) the location of the agent at the current time point and (ii) the location of the vehicle at the first future time point if the vehicle executes the partial candidate trajectory.

In some implementations, the prediction for the location of an agent at the first future time point identifies a single location that the agent is predicted to occupy.

In some other implementations, the prediction for the location of an agent identifies multiple different locations and, for each identified location, a corresponding likelihood that the agent will occupy the location at the first future time point. For example, for each surrounding agent in the environment, the system can generate a respective heatmap that identifies, for each of multiple locations in the environment, a respective likelihood that the agent will occupy the location at the first future time point. In some such implementations, the system can generate a single heatmap that collectively represents all of the surrounding agents in the environment; for example, for each of multiple locations in the environment, the heatmap can identify a likelihood that any agent will occupy the location at the first future time point. In some such implementations, the heatmap can further identify the location of the vehicle at the first future time point according to the partial candidate trajectory.

The system can generate the heatmap corresponding to a particular surrounding agent or to the set of all surrounding agents using an attention-based neural network, e.g., a transformer neural network, that is configured to autoregressively generate heatmaps corresponding to respective future time points. The attention-based neural network can be trained using real-world human driving data, and thus can be configured through training to generate sequences of heatmaps that mimic human driver behavior.

In some implementations, each of the multiple different prediction locations of an agent (e.g., as represented by respective non-zero elements of the heatmap) can correspond to respective possible "intents" of the agent, e.g., whether the agent intends to stay in its current lane, execute a lane change, turn off the road, and so on. The system can generate each prediction corresponding to a respective intent by processing hint data that characterizes the intent. Hint data is described in more detail above with reference to respective intents of the vehicle.

In some implementations, for each surrounding agent, the system generates a single prediction for the location of the agent at the first future time point, and uses the single prediction for the location to generate each prediction of the state of the environment at the first future time point corresponding to respective partial candidate trajectories. That is, the prediction for the location of the agent can be independent of the location of the vehicle at the first future time point.

In some other implementations, for each surrounding agent, the system generates a respective different prediction for the location of the agent according to the location of the vehicle at the first future time point defined by the partial candidate trajectory. In other words, the system can predict how the agent will behave in reaction to the vehicle's execution of the partial candidate trajectory.

For example, the system can generate an "initial" prediction for the location of one or more agents at the first future time point that is independent of the behavior of the vehicle (e.g., by inferring the initial prediction using the current velocity, acceleration, heading, etc., of the agent). For each partial candidate trajectory, the system can then update the initial prediction according to the corresponding location of the vehicle at the first future time point. For instance, the system can generate an initial heatmap corresponding to one or more surrounding agents, and update the initial heatmap to reflect the reaction of the one or more surrounding agents to the partial candidate trajectory of the vehicle.

In some implementations, the system updates the initial prediction for the location of the one or more agents heuristically, i.e., according to a predetermined set of rules. As a particular example, if executing the partial candidate trajectory will cause the vehicle to move closer to an agent, then the system can determine that the agent is likely to decelerate and/or drift away from the vehicle, and update the initial prediction accordingly.

In some other implementations, the system can update the initial prediction for the location of one or more agents by processing the initial prediction using a trained machined learning model. The machine learning model can be configured through training to process a model input that represents (i) the initial prediction and (ii) the partial candidate trajectory of the vehicle. For example, if the initial prediction for the location of the one or more agents is represented by a heatmap as described above, the system can generate the model input by updating the heatmap to include an identification of the location of the vehicle at the first future time point according to the partial candidate trajectory. As another example, the system can add a second channel to the heatmap that includes a representation of each location in the environment represented in the original heatmap and that identifies the location of the vehicle at the first future time step according to the partial candidate trajectory. As a particular example, the machine learning model can include a convolutional neural network that is configured to process the model input and to generate an updated prediction for the location of the one or more agents (e.g., generated an updated heatmap).

Continuing the first stage, the system can associate each partial candidate trajectory generated during the first stage with data characterizing the corresponding predicted state of the environment (step 308). For example, the data characterizing the predicted state of the environment corresponding to a particular partial candidate trajectory can include a top-down image of the environment at the first future time step that includes respective depictions of the vehicle and each surrounding agent in the environment at their corresponding predicted locations. In implementations in which the system generates multiple predicted locations for each agent in the environment, the top-down image can be a heatmap characterizing the predicted locations and corresponding predicted likelihoods.

Figure 4:
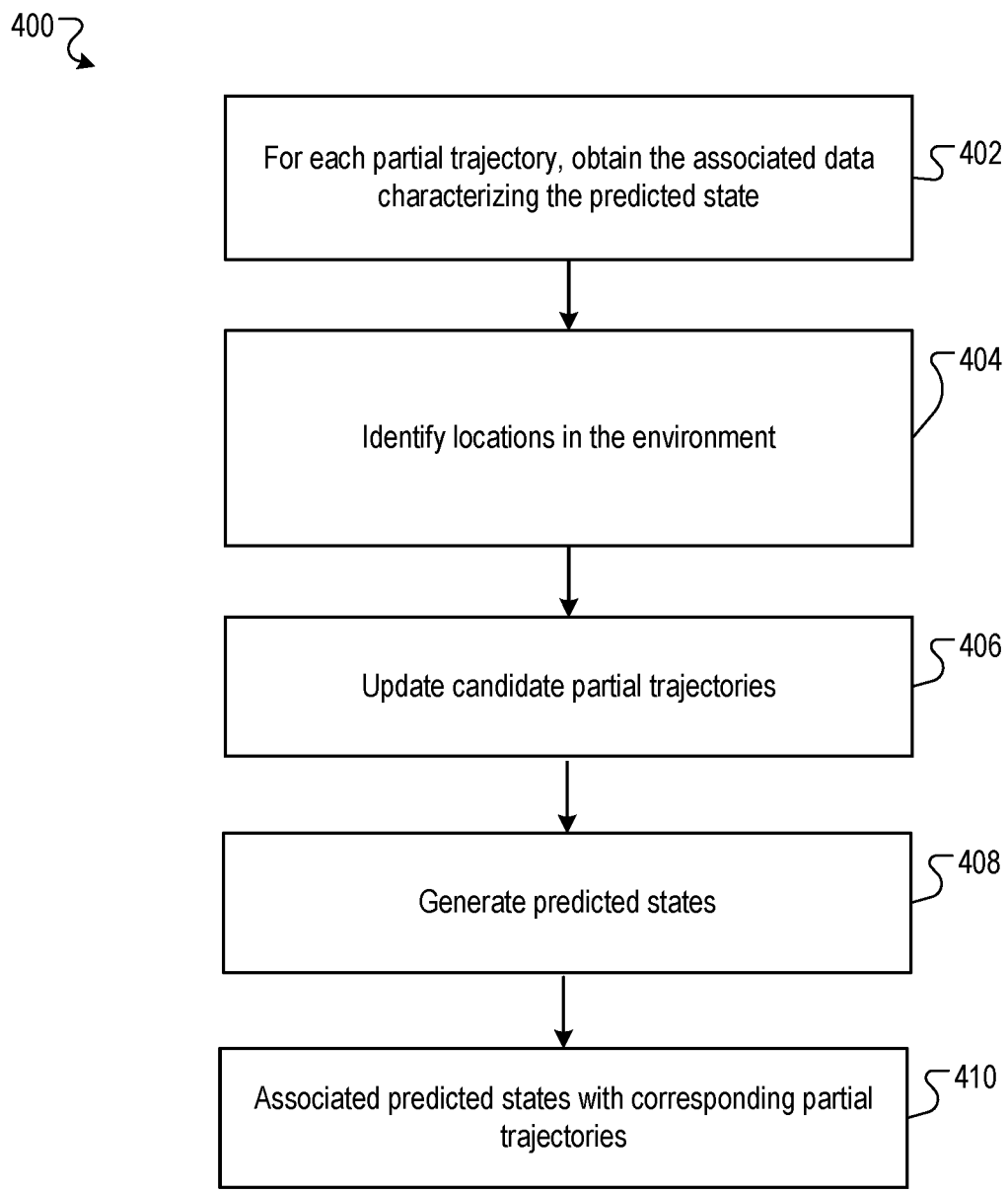
FIG. 4 is a flow diagram of an example process for performing a subsequent stage of the multi-stage process.

FIG. 4 is a flow diagram of an example process 400 for performing a subsequent stage of the multi-stage process. For convenience, the process 400 will be described as being performed by a system of one or more computers located in one or more locations. For example, a lane change system, e.g., the lane change system 150 of FIG. 1, appropriately programmed in accordance with this specification, can perform the process 400.

Generally, as described above, at each subsequent stage in the multi-stage process corresponding to respective subsequent future time steps in the sequence of future time steps, the system can update some or all of the partial candidate trajectories generated during the preceding stage.

More specifically, for each partial candidate trajectory generated during the preceding stage, the system generate one or more new trajectories by, for each of new trajectories, adding a location for the vehicle corresponding to the future time point of the current stage. For convenience, the future time point corresponding to the preceding stage is called the "preceding future time point" and the future time point corresponding to the current stage is called the "current future time point."

For each partial candidate trajectory generated during the preceding stage, the system can obtain the associated data characterizing the predicted state of the environment at the preceding future time step (step 402).

For each partial candidate trajectory generated during the preceding stage, the system can identify one or more locations in the environment that the vehicle can occupy at the current future time point if the vehicle executes the partial candidate trajectory up to the preceding future time point (step 404). That is, each possible location is a location in the environment to which the vehicle could feasibly navigate (i) from the location, according to the partial candidate trajectory, of the vehicle at the preceding future time point (ii) during the time frame from the preceding future time point to the current future time point. For example, the system can identify the possible locations according to a top-down lattice imposed on the environment, as described above.

For each partial candidate trajectory and for each corresponding possible location of the vehicle at the current future time point, the system can update the partial candidate trajectory to generate an updated partial candidate trajectory that includes the possible location at the current future time point (step 406). That is, each updated partial candidate trajectory includes (i) each location, corresponding to respective preceding future time points, that was in the partial candidate trajectory and (ii) a respective possible location of the vehicle at the current future time point.

For each updated partial candidate trajectory, the system can generate a prediction for the state of the environment at the current future time step, given that the vehicle executes the updated partial candidate trajectory (step 408). The system can obtain the associated data, corresponding to the partial candidate trajectory from which the updated partial candidate trajectory was generated, characterizing the predicted state of the environment at the preceding future time step, and update the predicted state of the environment by advancing to the current future time step. In particular, for each surrounding agent, the system can generate a prediction for the location of the surrounding agent at the current future time point, given (i) the location of the agent at the preceding future time point and (ii) the location of the vehicle at the current future time point if the vehicle executes the updated partial candidate trajectory. The system can use the techniques described above with reference to the first stage. The system can associate each updated partial candidate trajectory generated during the current stage with data characterizing the corresponding predicted state of the environment.

The system can then associate the prediction of the state of the environment with the updated partial trajectory (step 410).

In some implementations, after one or more of the stages of the multi-stage process, the system can prune the set of partial candidate trajectories generated during the state. That is, the system can determine to remove one or more of the generated partial candidate trajectories from the set, so that the removed trajectories are not evaluated at the subsequent stage of the multi-stage process.

For example, the system can process each generated partial candidate trajectory to generate a score for each partial candidate trajectory, and prune the trajectories according to the scores. As a particular example, the system can determine to keep only the N partial candidate trajectories with the highest scores. As another particular example, the system can determine to keep only the partial candidate trajectories whose scores satisfy a predetermined threshold. As another particular example, the system can determine to keep up to N partial candidate trajectories whose scores satisfy a predetermined threshold.

In some implementations, the system can generate the score for a partial candidate trajectory by obtaining data representing an initial planned trajectory of the vehicle and comparing the initial planned trajectory with the partial candidate trajectory. For example, the data representing the initial planned trajectory can be include a heatmap that identifies, for each time point represented by the partial candidate trajectory and for each of multiple location in the environment, a respective likelihood that the vehicle will occupy the location at the current future time point if the vehicle executes the initial planned trajectory. The system can generate the score according to a similarity between the partial candidate trajectory and the initial planned trajectory, e.g., according to the likelihood, identified by the initial planned trajectory, corresponding to the location of the vehicle at the current future time point according to the partial candidate trajectory. This process and other example techniques for scoring candidate trajectories are described in more detail below.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of generating a trajectory for an autonomous vehicle operating in an environment, the trajectory including a lane change, the method comprising:
    obtaining, by an on-board system of the autonomous vehicle, data characterizing a current location of the autonomous vehicle at a current time point, wherein the current location is in a first lane of a road comprising a plurality of lanes;
    receiving, by the on-board system of the autonomous vehicle, a request for a trajectory that navigates the autonomous vehicle from the first lane to a second lane of the plurality of lanes of the road;
    in response, generating, by the on-board system of the autonomous vehicle, a plurality of candidate trajectories for the autonomous vehicle to navigate from the first lane to the second lane, wherein each candidate trajectory comprises a respective location associated with each of a plurality of future time points, the generating comprising:
        at a first processing step corresponding to a first future time point, generating, by the on-board system of the autonomous vehicle, a plurality of partial candidate trajectories for the autonomous vehicle, wherein in each of the partial candidate trajectories the autonomous vehicle is located at a respective first location at the first future time point, wherein each respective first location is navigable from the current location of the autonomous vehicle in a time window between the current time point and the first future time point; and at each of a plurality of subsequent processing steps corresponding to respective subsequent future time points and for each of one or more partial candidate trajectories generated at the previous processing step:

identifying, by the on-board system of the autonomous vehicle, a preceding location of the autonomous vehicle in the partial candidate trajectory at a preceding future time point corresponding to the preceding processing step;

generating, by the on-board system of the autonomous vehicle, a plurality of different subsequent locations for the autonomous vehicle, wherein each subsequent location is navigable from the preceding location in a time window between the preceding future time point and the subsequent future time point; and generating, by the on-board system of the autonomous vehicle, a plurality of different new partial candidate trajectories for the autonomous vehicle by, for each of the plurality of different new candidate trajectories, adding a different one of the plurality of different subsequent locations as a location of the autonomous vehicle at a subsequent time point to the partial candidate trajectory;

determining, by the on-board system of the autonomous vehicle, a respective score for each of the plurality of candidate trajectories for the autonomous vehicle;

selecting, by the on-board system of the autonomous vehicle, a particular candidate trajectory for the autonomous vehicle according to the respective scores of the plurality of candidate trajectories; and causing, by the on-board system of the autonomous vehicle, the autonomous vehicle to follow a planned path based on selecting the particular candidate trajectory for the autonomous vehicle.

2. The method of claim 1, wherein:
there are a plurality of other agents travelling in the second lane of the road at the current time point; and
the plurality of candidate trajectories includes, for each of two or more different pairs of agents, one or more respective candidate trajectories in which the autonomous vehicle enters the second lane between the different pair of agents.

3. The method of claim 1, wherein determining a respective score for each of the plurality of candidate trajectories comprises, for each candidate trajectory:
generating a model input that characterizes (i) the current location of the autonomous vehicle at the current time point, (ii) the respective locations associated with respective future time points defined by the candidate trajectory; and
processing the model input using a machine learning model that has been configured through training to generate scores for trajectories.

4. The method of claim 3, wherein the model input further characterizes, for each of one or more other agents in the environment, (i) a current location of the agent in the environment at the current time point and (ii) a respective predicted location of the agent corresponding to each of the future time points identified by the candidate trajectory.

5. The method of claim 1, wherein determining a respective score for each of the plurality of candidate trajectories comprises:
obtaining data representing an initial planned trajectory of the autonomous vehicle; and
for each candidate trajectory, generating a score penalty for the candidate trajectory according to a degree to which the candidate trajectory differs from the initial planned trajectory.

6. The method of claim 5, wherein:
the data representing the initial planned trajectory comprises a sequence of heatmaps, wherein each heatmap in the sequence of heatmaps corresponding to a respective future time point of the plurality of future time point and identified, for each of multiple locations in the environment, a likelihood that the autonomous vehicle will occupy the location at the corresponding future time point; and
determining the respective score for each candidate trajectory comprises identifying, for each of the plurality of future time points, the likelihood, identified by the heatmap in the sequence of heatmaps corresponding to the future time point, that the autonomous vehicle will occupy the location at the future time point identified by the candidate trajectory.

7. The method of claim 6, wherein the sequence of heatmaps has been generated by an autoregressive neural network that has been trained using human driving data.

8. The method of claim 1, wherein determining a respective score for each of the plurality of candidate trajectories comprises, for each candidate trajectory:
determining, for each future time point identified by the candidate trajectory, a respective sub-score according to a predicted state of the environment at the future time point if the autonomous vehicle were to execute the candidate trajectory; and
combining the respective sub-scores to generate the score for the candidate trajectory.

9. The method of claim 1, wherein determining a respective score for each of the plurality of candidate trajectories comprises, for each candidate trajectory:
determining a respective value for each of a plurality of parameters characterizing the candidate trajectory; and
computing a weighted sum of the values of the plurality of parameters.

10. The method of claim 9, wherein the plurality of parameters characterizing the candidate trajectory comprises one or more of:
a parameter identifying whether the candidate trajectory would cause the autonomous vehicle to collide or nearly collide with another agent in the environment;
a parameter identifying whether the candidate trajectory would cause the autonomous vehicle to occupy a blind spot of another agent in the environment;
a parameter characterizing how quickly the candidate trajectory would cause the autonomous vehicle to merge into the second lane;
a parameter identifying whether the candidate trajectory would cause the autonomous vehicle to shift away from the second lane;
a parameter identifying whether the candidate trajectory would cause the autonomous vehicle to cross a lane boundary other than a particular lane boundary between the first lane and the second lane;

a parameter identifying a degree to which the candidate trajectory would cause the autonomous vehicle to impose discomfort on one or more other agents in the environment; or a parameter characterizing a similarity between the candidate trajectory and an initial planned trajectory of the autonomous vehicle.

11. The method of claim 1, further comprising, at each of the plurality of subsequent processing steps:

determining an intermediate score for each of a plurality of partial candidate trajectories generated at the previous processing step; and pruning one or more of the partial candidate trajectories generated at the previous processing step according to the intermediate scores.

12. The method of claim 1, wherein causing, by the on-board system of the autonomous vehicle, the autonomous vehicle to follow a planned path based on selecting the particular candidate trajectory for the autonomous vehicle further comprises:

operating the autonomous vehicle to execute the particular candidate trajectory.

13. The method of claim 1, further comprising, at each processing time step and for each partial candidate trajectory generated during the processing time step:

generating data representing a predicted state of the environment if the autonomous vehicle executes the partial candidate trajectory.

14. The method of claim 13, wherein the data representing the predicted state of the environment comprises a heatmap identifying, for each of multiple locations in the environment, a respective likelihood that an agent will occupy the location at the future time step corresponding to the processing time step if the autonomous vehicle executes the partial candidate trajectory.

15. A system comprising one or more computers and one or more storage devices storing instructions that when executed by the one or more computers cause the one or more computers to perform operations for generating a trajectory for an autonomous vehicle operating in an environment, the trajectory including a lane change, the operations comprising:

obtaining, by an on-board system of the autonomous vehicle, data characterizing a current location of the autonomous vehicle at a current time point, wherein the current location is in a first lane of a road comprising a plurality of lanes;

receiving, by the on-board system of the autonomous vehicle, a request for a trajectory that navigates the autonomous vehicle from the first lane to a second lane of the plurality of lanes of the road;

in response, generating, by the on-board system of the autonomous vehicle, a plurality of candidate trajectories for the autonomous vehicle to navigate from the first lane to the second lane, wherein each candidate trajectory comprises a respective location associated with each of a plurality of future time points, the generating comprising:

at a first processing step corresponding to a first future time point, generating, by the on-board system of the autonomous vehicle, a plurality of partial candidate trajectories for the autonomous vehicle, wherein in each of the partial candidate trajectories the autonomous vehicle is located at a respective first location at the first future time point, wherein each respective first location is navigable from the current location of the autonomous vehicle in a time window between the current time point and the first future time point; and at each of a plurality of subsequent processing steps corresponding to respective subsequent future time points and for each of one or more partial candidate trajectories generated at the previous processing step:

identifying, by the on-board system of the autonomous vehicle, a preceding location of the autonomous vehicle in the partial candidate trajectory at a preceding future time point corresponding to the preceding processing step;

generating, by the on-board system of the autonomous vehicle, a plurality of different subsequent locations for the autonomous vehicle, wherein each subsequent location is navigable from the preceding location in a time window between the preceding future time point and the subsequent future time point; and generating, by the on-board system of the autonomous vehicle, a plurality of different new partial candidate trajectories for the autonomous vehicle by, for each of the plurality of different new candidate trajectories, adding a different one of the plurality of different subsequent locations as a location of the autonomous vehicle at a subsequent time point to the partial candidate trajectory;

determining, by the on-board system of the autonomous vehicle, a respective score for each of the plurality of candidate trajectories for the autonomous vehicle;

selecting, by the on-board system of the autonomous vehicle, a particular candidate trajectory for the autonomous vehicle according to the respective scores of the plurality of candidate trajectories; and causing, by the on-board system of the autonomous vehicle, the autonomous vehicle to follow a planned path based on selecting the particular candidate trajectory for the autonomous vehicle.

16. The system of claim 15, wherein:

there are a plurality of other agents travelling in the second lane of the road at the current time point; and the plurality of candidate trajectories includes, for each of two or more different pairs of agents, one or more respective candidate trajectories in which the autonomous vehicle enters the second lane between the different pair of agents.

17. The system of claim 15, wherein determining a respective score for each of the plurality of candidate trajectories comprises, for each candidate trajectory:

generating a model input that characterizes (i) the current location of the autonomous vehicle at the current time point, (ii) the respective locations associated with respective future time points defined by the candidate trajectory; and processing the model input using a machine learning model that has been configured through training to generate scores for trajectories.

18. The system of claim 17, wherein the model input further characterizes, for each of one or more other agents in the environment, (i) a current location of the agent in the environment at the current time point and (ii) a respective predicted location of the agent corresponding to each of the future time points identified by the candidate trajectory.

19. The system of claim 15, wherein determining a respective score for each of the plurality of candidate trajectories comprises:

obtaining data representing an initial planned trajectory of the autonomous vehicle; and for each candidate trajectory, generating a score penalty for the candidate trajectory according to a degree to which the candidate trajectory differs from the initial planned trajectory.

20. One or more non-transitory computer-readable storage media storing instructions that when executed by one or more computers cause the one or more computers to perform operations for generating a trajectory for an autonomous vehicle operating in an environment, the trajectory including a lane change, the operations comprising:

obtaining, by an on-board system of the autonomous vehicle, data characterizing a current location of the autonomous vehicle at a current time point, wherein the current location is in a first lane of a road comprising a plurality of lanes;

receiving, by the on-board system of the autonomous vehicle, a request for a trajectory that navigates the autonomous vehicle from the first lane to a second lane of the plurality of lanes of the road;

in response, generating, by the on-board system of the autonomous vehicle, a plurality of candidate trajectories for the autonomous vehicle to navigate from the first lane to the second lane, wherein each candidate trajectory comprises a respective location associated with each of a plurality of future time points, the generating comprising:

at a first processing step corresponding to a first future time point, generating, by the on-board system of the autonomous vehicle, a plurality of partial candidate trajectories for the autonomous vehicle, wherein in each of the partial candidate trajectories the autonomous vehicle is located at a respective first location at the first future time point, wherein each respective first location is navigable from the current location of the autonomous vehicle in a time window between the current time point and the first future time point; and at each of a plurality of subsequent processing steps corresponding to respective subsequent future time points and for each of one or more partial candidate trajectories generated at the previous processing step:

identifying, by the on-board system of the autonomous vehicle, a preceding location of the autonomous vehicle in the partial candidate trajectory at a preceding future time point corresponding to the preceding processing step;

generating, by the on-board system of the autonomous vehicle, a plurality of different subsequent locations for the autonomous vehicle, wherein each subsequent location is navigable from the preceding location in a time window between the preceding future time point and the subsequent future time point; and generating, by the on-board system of the autonomous vehicle, a plurality of different new partial candidate trajectories for the autonomous vehicle by, for each of the plurality of different new candidate trajectories, adding a different one of the plurality of different subsequent locations as a location of the autonomous vehicle at a subsequent time point to the partial candidate trajectory;

determining, by the on-board system of the autonomous vehicle, a respective score for each of the plurality of candidate trajectories for the autonomous vehicle;

selecting, by the on-board system of the autonomous vehicle, a particular candidate trajectory for the autonomous vehicle according to the respective scores of the plurality of candidate trajectories; and causing, by the on-board system of the autonomous vehicle, the autonomous vehicle to follow a planned path based on selecting the particular candidate trajectory for the autonomous vehicle.

* * * * *